Patented Mar. 10, 1942

2,275,466

UNITED STATES PATENT OFFICE 2,275,466

PREPARATION OF UNSATURATED ALCOHOL ESTERS

Maxwell A. Pollack, Akron, and Albert G. Chenicek, Barberton, Ohio, assignors to Pittsburgh Plate Glass Company, Allegheny County, Pa., a corporation of Pennsylvania No Drawing. Application January 27, 1940, Serial No. 315,968

23 Claims. (Cl. 260—486)

This invention relates to the methods of separating allyl type halides from halo-olefin mixtures containing the same. In the manufacture of allyl type halides by halogenation of olefins or by dehydrohalogenation of dihalo aliphatic hydrocarbons, mixtures of allyl type halides and other halo-olefins are secured. Thus, upon chlorination of propylene at temperatures above 200° C., a mixture is produced which contains allyl chloride and vinyl type halides in which the halogen is attached to an unsaturated carbon atom. Separation of these halides is often difficult since they possess boiling points which are approximately the same and fractionation by distillation is difficult.

In accordance with our invention, we have found that the allyl type halides may be separated from the vinyl type halides by subjecting the mixture to the action of a salt of an organic acid. In such cases, the allyl type halides are found to react with the salt to form a corresponding ester while the vinyl type halides are substantially unaffected.

The invention is particularly effective in serving as a means for removing allyl chloride or similar chloride from a mixture containing other chlorolefins such as 1-chloropropene-1, and 2-chloropropene-1 which are often present in admixture with the allyl or similar chloride. In addition, the invention may be applied to the treatment of other halide mixtures containing allyl type halides which comprise the grouping

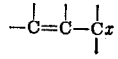

wherein $x$ is halogen and vinyl type halides which comprise the grouping

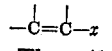

where $x$ is halogen. Thus, the reaction mixtures obtained by chlorination by allylic substitution of propylene, butylene, isobutylene, amylene, etc., or by dehydrochlorination of propylene dichloride, butylene dichloride, etc. may be treated in accordance with the invention.

The reaction is preferably conducted in an aqueous medium and in most cases it is found desirable to conduct the reaction in the presence of a suitable agent capable of reducing the surface tension of the aqueous medium, such as sodium oleate, trisodium phosphate, alcohols such as methyl or ethyl alcohol, sulphuric or sulphonic esters of primary aliphatic alcohols such as hexyl, lauryl, or octyl sulphate, aryl or aralkyl sulphonates, or sulphonic acids such as isopropyl naphthalene sulphonic acid, phenol sulphonic acid, benzene sulphonic acid or the sodium salts thereof, Turkey red oil, alkylol amines such as triethanol amine or mono ethanol amine, sodium silicate, colloidal silicic acid, etc. The amount of surface tension reducing agent required is capable of some variation but in most cases should not be present in large quantities. Generally, sufficient agent is used to reduce the surface tension of the aqueous medium below about 50 to 60 dynes per centimeter. 0.1 to 0.5 percent has been found suitable for most purposes. In general, excess concentrations of wetting agents such as alcohol are undesirable since the alcohol increases the solubility of the ester in the aqueous medium, thus making recovery of the ester more difficult.

Various organic salts have been found to be effective but in general, the alkali metal salts such as the sodium salts are most suitable. Sodium salts of saturated mono- or polycarboxylic acid such as salts of mono alkyl or alkenyl partial esters, for example, sodium methyl, ethyl allyl, methallyl, or crotyl oxalate, tartrate, citrate, fumarate, maleate, etc., or other salts such as mono-, di-, or polysodium oxalate, tartrate, citrate, formate, acetate, succinate, tetrolate, benzoate, valerate, malonate, citraconate, pyruvate, lactate, propionate, dichloro propionate or phthalate or of unsaturated acids such as mono- or disodium maleate or fumarate, sodium crotonate, acrylate, α-chloracrylate, itaconate, α-bromacrylate, methacrylate, cinnamate, propiolate, benzoate, or the sodium salts of cyanuric acid and ammeline, ammelide, kojic acid, phenol, cresol, resorcinol, etc. may be used for this purpose. In addition, the corresponding salts of other alkali metals such as potassium or lithium may be used. In like manner, other metallic salts such as ammonium, calcium, barium, strontium, magnesium, copper, zinc, iron, chromium, silver salts or other salts may be treated. Similarly, salts of inorganic acids such as sodium sulphide, sulphite, thiocyanate, phosphate, nitrite, cyanide, or other salt may be used in accordance with this invention. In general, it is found that the yields obtained from salts of relatively weak acids are substantially greater than those obtained from salts of relatively strong acids. For this reason, it is desirable to use salts of weak organic acids which have determinable dissociation constants, generally below about 0.05 and preferably not in substantial excess of 0.02.

The amount of water present should be at least sufficient to dissolve all or a substantial portion of the salt or at least to form a thin aqueous slurry of the salt. In general, it is preferred to utilize a solution which is not excessively concentrated. The reaction is preferably assisted by application of heat to maintain the temperature of the reaction at 40 to 250° C. The reaction may be conducted in a closed vessel and pressure may be applied, if desired, but in many cases, this is undesirable since polymerization of the allyl chloride and/or the ester may occur, thus complicating the reaction. In accordance with our invention, we have found that it is desirable to avoid the use of pressure. This may be done by introducing vapors of the unsaturated halides into the lower portion of an aqueous solution or dispersion of the salt, whereby reaction occurs and the vapors of allylchloride are absorbed. Unreacted vinyl type olefins are not absorbed and pass through the solution and may be collected and condensed, if desired, as they escape from the reaction solution. If all of the allyl chloride or other allyl type halide is not absorbed, the vapors may be recycled or retreated in order to complete the separation. The halide vapors may be bubbled through the solutions continuously if desired, and a portion of the solution withdrawn continuously or intermittently. The ester thus formed separates into a layer and may be withdrawn. In the case of such materials as diallyl phthalate the ester generally settles to the bottom of the container. However, occasionally the ester becomes mixed with allyl chloride or other chlorolefin and in consequence, the resulting mixture rises to the surface of the aqueous solution.

By operation in accordance with this invention, it is possible to secure a substantially complete separation of the allyl type chlorides from the mixture without appreciable loss of the vinyl type halides and to secure allyl esters as additional products. In treating salts of polycarboxylic acids either the mono or polyesters may be prepared.

In some cases it is found desirable to utilize partially esterified salts such as sodium allyl phthalate, sodium methyl phthalate, sodium ethyl phthalate, sodium crotyl phthalate, sodium ethyl maleate, sodium allyl or other mono unsaturated or saturated maleate, succinate, itaconate, tartrate, citrate, etc. Utilization of such agents often results in higher yields of allyl esters and permits the preparation of mixed esters in a simple manner.

The following examples are illustrative:

*Example I.*—A mixture containing approximately 60 parts by weight of allyl chloride and 40 parts by weight of a mixture of 1-chloropropene and 2-chloropropene 1 was added dropwise to an aqueous solution containing 20 percent by weight of sodium crotonate and 0.5 percent by weight of isopropyl naphthalene sodium sulphonate at a temperature of 75–90° C. Reaction between the allyl chloride and sodium crotonate occurred immediately and the other chloropropenes were vaporized and collected substantially free from allyl chloride. The allyl crotonate thus formed separated in a layer upon the aqueous solution and was recovered.

*Example II.*—The mixture of chloropropenes produced by dehydrochlorination of propylene chloride at a temperature of 550–600° C. was vaporized and the vapors passed through a column of an aqueous solution containing 15 percent of sodium phthalate and 0.2 percent of isopropyl naphthalene sodium sulphonate at a temperature of 80–100° C. The allyl chloride was absorbed by the solution to form diallyl phthalate and the remaining chloropropenes passed through the mixture and were recovered. The process was operated continuously for many hours and allyl phthalate separated as a layer and was withdrawn continuously.

*Example III.*—The process of Example II was repeated using a solution containing 20 percent by weight of sodium methacrylate, 0.03 percent para phenylene diamine and 0.5 percent by weight of isopropyl naphthalene sodium sulphonate at a temperature of 79–88° C., allyl methacrylate being produced.

While the invention has been described particularly with reference to the treatment in aqueous solutions, it is not so limited since the reaction may be conducted in the absence of water, for example, by heating the unsaturated halide with the salt in the presence or absence of a solvent for the salt, such as alcohol, etc. Thus, in certain cases such as in the preparation of oxalic acid esters, where hydrolysis occurs to an undesirable degree, the treatment in the absence of water may be advantageous.

Although the present invention has been described with particular reference to the specific details of certain embodiments thereof, it is not intended that such details shall be regarded as limitations upon the scope of the invention except insofar as included in the accompanying claims.

We claim:

1. A method of removing an allyl halide from a mixture containing an allyl halide containing halogen linked to a saturated carbon atom and a vinyl halide containing halogen linked to an unsaturated carbon atom which comprises reacting the mixture with a salt of a weak organic acid whereby an allyl ester of said acid is formed without substantial decomposition of the vinyl halide.

2. A method of removing an allyl chloride from a mixture containing an allyl chloride which contains a chlorine atom linked to a saturated carbon atom and a vinyl chloride containing a chlorine atom linked to an unsaturated carbon atom which comprises reacting the mixture with an aqueous dispersion of a salt of a weak organic acid whereby an allyl ester of said acid is formed without substantial decomposition of the vinyl chloride.

3. A method of removing an allyl chloride from a mixture containing an allyl chloride which contains a chlorine atom linked to a saturated carbon atom and a vinyl chloride containing a chlorine atom linked to an unsaturated carbon atom which comprises reacting the mixture with an aqueous solution of an alkali metal salt of a weak organic acid whereby an allyl ester of said acid is formed without substantial decomposition of the vinyl chloride.

4. A method of removing an allyl chloride from a mixture containing an allyl chloride which contains a chlorine atom linked to a saturated carbon atom and a vinyl chloride containing a chlorine atom linked to an unsaturated carbon atom which comprises reacting the mixture with an aqueous solution of a sodium salt of a weak organic acid whereby an allyl ester of said acid is formed without substantial decomposition of the vinyl chloride.

5. A method of removing an allyl chloride from a mixture containing an allyl chloride which contains a chlorine atom linked to a saturated carbon atom and a vinyl chloride containing a chlorine atom linked to an unsaturated carbon atom which comprises reacting a vaporized mixture thereof with an aqueous dispersion of a salt of a weak organic acid whereby an allyl ester of said acid is formed without substantial decomposition of the vinyl chloride.

6. A method of removing an allyl chloride from a mixture containing an allyl chloride which contains a chlorine atom linked to a saturated carbon atom and a vinyl chloride containing a chlorine atom linked to an unsaturated carbon atom which comprises reacting the mixture with an aqueous solution of a sodium salt of a weak organic acid in the presence of an agent capable of reducing the surface tension of the aqueous medium whereby an allyl ester of said acid is formed without substantial decomposition of the vinyl chloride.

7. A method of removing an allyl chloride from a mixture containing an allyl chloride which contains a chlorine atom linked to a saturated carbon atom and a vinyl chloride containing a chlorine atom linked to an unsaturated carbon atom which comprises reacting the mixture with an aqueous dispersion of a salt of a weak organic acid in the presence of an agent capable of reducing the surface tension of the aqueous medium whereby an allyl ester of said acid is formed without substantial decomposition of the vinyl chloride.

8. A method of removing allyl chloride from a mixture containing allyl chloride and vinyl chloride which comprises reacting the mixture with a salt of a weak organic acid whereby an allyl ester is produced without substantial decomposition of the vinyl chloride.

9. A method of removing allyl chloride from a mixture containing allyl chloride and vinyl chloride which comprises reacting the mixture with an aqueous solution of an alkali metal salt of a weak organic acid whereby an allyl ester is produced without substantial decomposition of the vinyl chloride.

10. A method of removing allyl chloride from a mixture containing allyl chloride and a vinyl chloride containing a chlorine atom linked to an unsaturated carbon atom which comprises reacting the mixture with a salt of a weak organic acid in the presence of an agent capable of reducing the surface tension of the aqueous medium whereby an allyl ester is produced without substantial decomposition of the vinyl chloride.

11. A method of removing allyl chloride from a mixture containing allyl chloride and vinyl chloride which comprises reacting the mixture with an aqueous solution of an alkali metal salt of a weak organic acid in the presence of an agent capable of reducing the surface tension of the aqueous medium whereby an allyl ester is produced without substantial decomposition of the vinyl chloride.

12. A method of removing allyl chloride from a mixture containing allyl chloride and vinyl chloride which comprises reacting a vaporized mixture thereof with an aqueous solution of a salt of a weak organic acid in the presence of an agent capable of reducing the surface tension of the aqueous medium whereby an allyl ester is produced without substantial decomposition of the vinyl chloride.

13. A method of removing an allyl halide from a mixture containing an allyl halide containing halogen linked to a saturated carbon atom and a vinyl halide containing halogen linked to an unsaturated carbon atom which comprises reacting the mixture with a salt of an unsaturated monobasic organic carboxylic acid whereby an allyl ester of said acid is formed without substantial decomposition of the vinyl halide.

14. A method of removing allyl chloride from a mixture containing allyl chloride and vinyl chloride containing a chlorine atom linked to an unsaturated carbon atom which comprises reacting the mixture with a salt of a weak unsaturated monobasic organic carboxylic acid whereby an allyl ester is produced without substantial decomposition of the vinyl chloride.

15. The process of claim 14 wherein the acid in an acid of the group consisting of acrylic, alpha-substituted acrylic and crotonic acids.

16. The process of claim 1 wherein the acid is an acid of the group consisting of acrylic, alpha-substituted acrylic and crotonic acids.

17. The process of claim 6 wherein the acid is an acid of the group consisting of acrylic, alpha-substituted acrylic and crotonic acids.

18. The process of claim 1 wherein the salt is sodium crotonate.

19. The process of claim 1 wherein the salt is an alkali metal salt of crotonic acid.

20. The process of claim 1 wherein the salt is sodium methacrylate.

21. The process of claim 1 wherein the salt is sodium acrylate.

22. A method of removing an allyl halide from a mixture containing an allyl halide containing halogen linked to a saturated carbon atom and a vinyl halide containing halogen linked to an unsaturated carbon atom which comprises reacting the mixture with a salt of an organic carboxylic acid whereby an allyl ester of said acid is formed without substantial decomposition of the vinyl halide.

23. A method of removing an allyl chloride from a mixture containing an allyl chloride which contains a chlorine atom linked to a saturated carbon atom and a vinyl chloride containing a chlorine atom linked to an unsaturated carbon atom which comprises reacting the mixture with a salt of an organic carboxylic acid whereby an allyl ester of said acid is formed without substantial decomposition of the vinyl chloride.

ALBERT G. CHENICEK.
MAXWELL A. POLLACK.